United States Patent
Park et al.

(10) Patent No.: US 11,682,302 B2
(45) Date of Patent: Jun. 20, 2023

(54) SERVER, PERSONAL MOBILITY COMMUNICATING WITH SERVER AND VEHICLE

(71) Applicants: Hyundai Motor Company, Seoul (KR); Kia Motors Corporation, Seoul (KR)

(72) Inventors: Minjae Park, Gyeonggi-do (KR); Seunghyun Woo, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 257 days.

(21) Appl. No.: 17/060,914

(22) Filed: Oct. 1, 2020

(65) Prior Publication Data
US 2021/0383696 A1 Dec. 9, 2021

(30) Foreign Application Priority Data
Jun. 8, 2020 (KR) .................. 10-2020-0069047

(51) Int. Cl.
| | |
|---|---|
| G08G 1/127 | (2006.01) |
| H04W 4/021 | (2018.01) |
| G08G 1/0962 | (2006.01) |
| G08G 1/0967 | (2006.01) |
| G05D 1/02 | (2020.01) |
| G01C 21/34 | (2006.01) |

(52) U.S. Cl.
CPC .......... *G08G 1/127* (2013.01); *G05D 1/0231* (2013.01); *G05D 1/0276* (2013.01); *G05D 1/0289* (2013.01); *G08G 1/0962* (2013.01); *G08G 1/0967* (2013.01); *H04W 4/021* (2013.01); *G05D 2201/0213* (2013.01); *G08G 1/096725* (2013.01)

(58) Field of Classification Search
CPC ..... G08G 1/127; G08G 1/0967; G08G 1/0962
See application file for complete search history.

(56) References Cited

U.S. PATENT DOCUMENTS

| | | | | |
|---|---|---|---|---|
| 2015/0154871 | A1* | 6/2015 | Rothoff | G08G 1/22 701/2 |
| 2016/0054736 | A1* | 2/2016 | Kolhouse | G08G 1/0175 701/96 |
| 2018/0301034 | A1* | 10/2018 | Morita | G01C 21/3492 |
| 2021/0118293 | A1* | 4/2021 | Yi | G08G 1/0133 |

FOREIGN PATENT DOCUMENTS

KR 10-1984922 B1 5/2019

* cited by examiner

*Primary Examiner* — Tan Q Nguyen
(74) *Attorney, Agent, or Firm* — Fox Rothschild LLP

(57) ABSTRACT

A server, a personal mobility communicating with the server and a vehicle are provided. The server includes a transceiver that communicates with vehicles and a plurality of personal mobility. A controller sets a geo-fence area based on a size information of the vehicles and a size information of the plurality of personal mobility during cluster driving. The controller determines driving positions of the vehicles as primary in the set geo-fence area based on the size information of the vehicles, determines driving positions of the plurality of personal mobility as secondary in the set geo-fence area based on the size information of the plurality of personal mobility and adjusts layout information for the driving positions determined as the primary and the secondary to be transmitted to the vehicles and the plurality of personal mobility.

17 Claims, 13 Drawing Sheets

FIG. 2A    FIG. 2B    FIG. 2C    FIG. 2D
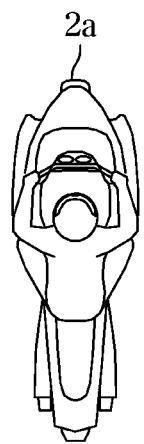
2a
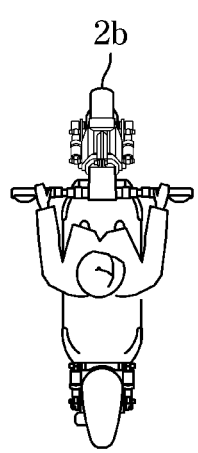
2b
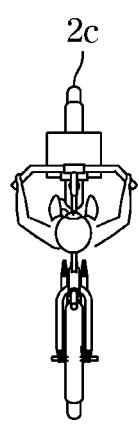
2c
2d
FIG. 3A    FIG. 3B    FIG. 3C    FIG. 3D    FIG. 3E
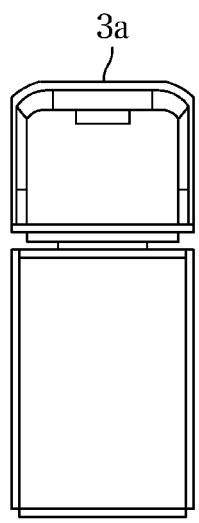
3a
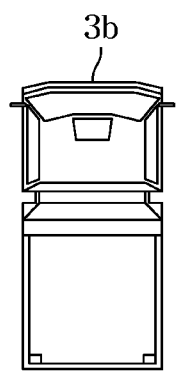
3b
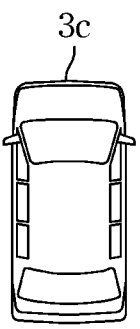
3c
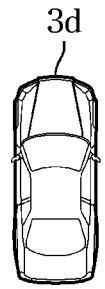
3d
3e

SERVER, PERSONAL MOBILITY COMMUNICATING WITH SERVER AND VEHICLE

CROSS-REFERENCE TO RELATED APPLICATION(S)

This application is based on and claims priority under 35 U.S.C. § 119 to Korean Patent Application No. 10-2020-0069047, filed on Jun. 8, 2020 the disclosure of which is incorporated by reference in its entirety.

BACKGROUND

1. Technical Field

The present disclosure relates to a server for guiding and monitoring cluster driving, a personal mobility communicating with the server and a vehicle.

2. Description of the Related Art

Recently, a development of a single-person vehicle called a personal mobility has increased due to environmental regulations and an increase in metropolitan cities. The personal mobility is a medium/short range mobile device that combines electric charging and power technologies, and is also referred to as a smart mobility and micro mobility.

In other words, personal mobility does not emit environmental pollutants since the power is electricity. In addition, personal mobility is in the spotlight as a mobile device that is easy to carry and may solve issues related traffic jams and parking problems. Such personal mobility may be owned by an individual, but may also be used as a rental through a sharing service. In other words, users may rent and use personal mobility through a sharing service. In addition, a user using personal mobility may perform cluster driving using personal mobility together with a user using other personal mobility.

SUMMARY

Therefore, an aspect of the present disclosure provides a server that sets and guides driving positions of vehicles and personal mobility on the road when the vehicle and personal mobility are driving together. In addition, another aspect of the present disclosure provides a personal mobility and vehicle that allows driving in a driving position set by the size of the vehicle and personal mobility.

In accordance with one aspect of the disclosure, a server may include: a transceiver configured to communicate with a plurality of vehicles and a plurality of personal mobility; and a controller configured to set a geo-fence area based on a size information of the plurality of vehicles and a size information of the plurality of personal mobility during cluster driving, determine driving positions of the plurality of vehicles as primary in the set geo-fence area based on the size information of the plurality of vehicles, determine driving positions of the plurality of personal mobility as secondary in the set geo-fence area based on the size information of the plurality of personal mobility and adjust layout information for the driving positions determined as the primary and the secondary to be transmitted to the plurality of vehicles and the plurality of personal mobility.

The transceiver may be configured to receive the size information of the plurality of vehicles and the size information of the plurality of personal mobility. The server may further include: a storage configured to store size information for each vehicle and size information for each personal mobility, and the controller, in response to receiving identification information of each vehicle and identification information of each personal mobility from the transceiver, may be configured to confirm the size information of each vehicle corresponding to the received identification information of each vehicle and the size information of each personal mobility corresponding to the identification information of each personal mobility from the information stored in the storage.

In response to receiving a cluster driving request signal and current location information from at least one vehicle or personal mobility, the controller may be configured to transmit a cluster driving proposal signal to a vehicle and personal mobility existing within a certain distance from a current location among the plurality of vehicles and the plurality of personal mobility based on the received current location information and determine a driving position for a vehicle or personal mobility that transmitted an approval signal for cluster driving.

The controller may be configured to determine whether a road of a current location is a road on which both a vehicle and a personal mobility are capable of driving based on the current location information and map information when a vehicle and personal mobility are included in a target for performing cluster driving. The controller may be configured to determine whether a road of a current location is a road capable of autonomous driving based on the current location information and map information during the cluster driving.

When placing the plurality of vehicles in the geo-fence area to determine the driving position of the plurality of vehicles as primary, the controller may be configured to place a vehicle from a front area to a rear area one of a left lane and a right lane among the lanes in the geo-fence area after placing a vehicle from a front area to a rear area of the other of the left lane and the right lane among the lanes in the geo-fence area. When there are more vehicles to be placed in the state where the vehicle is placed in the left and right lanes in the geo-fence area, the controller may be configured to place a vehicle remaining from the front area of the central lane in the geo-fence area.

Additionally, when placing the plurality of vehicles in the geo-fence area, the controller may be configured to place the vehicles in order of size from a large vehicle to a small vehicle. The controller may be configured to confirm the remaining area in the geo-fence area when the placing of the plurality of vehicles is completed and place the plurality of personal mobility in the confirmed remaining area. The controller may be configured to adjust the driving position of the vehicle placed in the central lane in the geo-fence area based on the driving position of the personal mobility.

Further, the controller may be configured to place the plurality of vehicles in an area corresponding to the border of the geo-fence area when the design mode is a safe mode and place the plurality of personal mobility in the central area of the geo-fence area. The controller may be configured to place the vehicles in order of size from a large vehicle when placing the plurality of vehicles. The controller may be configured to place the plurality of vehicles in order of size from a small vehicle to a large vehicle from the front area to the rear area of the geo-fence area when design mode is aerodynamic mode, and place the plurality of personal mobility in the rear area of the largest vehicle.

When a vehicle less than a reference size is detected, the controller may be configured to place the plurality of vehicles less than the reference size in the rear area of the largest vehicle, and place the plurality of personal mobility in the rear area of the vehicle less than the reference size. The controller may be configured to place at least two personal mobility between right and left neighboring vehicles when the lane width in the geo-fence area is greater than or equal to a reference width.

The controller may be configured to place one personal mobility in a lane in which a vehicle less than a preset size is placed when the number of lanes in the geo-fence area is less than a reference number. The size information of each personal mobility may include an area size information for a safety area of each personal mobility and the size information of each vehicle may include an area size information for a safety area of each vehicle.

In accordance with another aspect of the disclosure, a personal mobility may include: a transceiver configured to communicate with a server; a motor configured to rotate a wheel; and a controller configured to operate the motor to move to a driving position determined by the server based on layout information and driving location information received from the server when performing a clustering mode and operate the motor to travel to a destination while maintaining the driving position based on route information.

In accordance with another aspect of the disclosure, a vehicle may include: a transceiver configured to communicate with a server; a power plant configured to drive a plurality of wheels; and a controller configured to operate the power plant to move to a driving position determined by the server based on layout information and driving location information received from the server when performing a clustering mode and operate the power plant to travel to a destination while maintaining the driving position based on route information.

The vehicle may further include: an image acquisition device configured to obtain road image; and an obstacle detector configured to detect obstacle, and the controller may be configured to recognize a driving position based on the obtained road image and obstacle information for the detected obstacle and recognize personal mobility and other vehicles performing cluster driving.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 2A-2D and 3A-3E are exemplary views of a mobile body performing cluster driving in a cluster driving system according to an exemplary embodiment.

DETAILED DESCRIPTION

Figure 1:
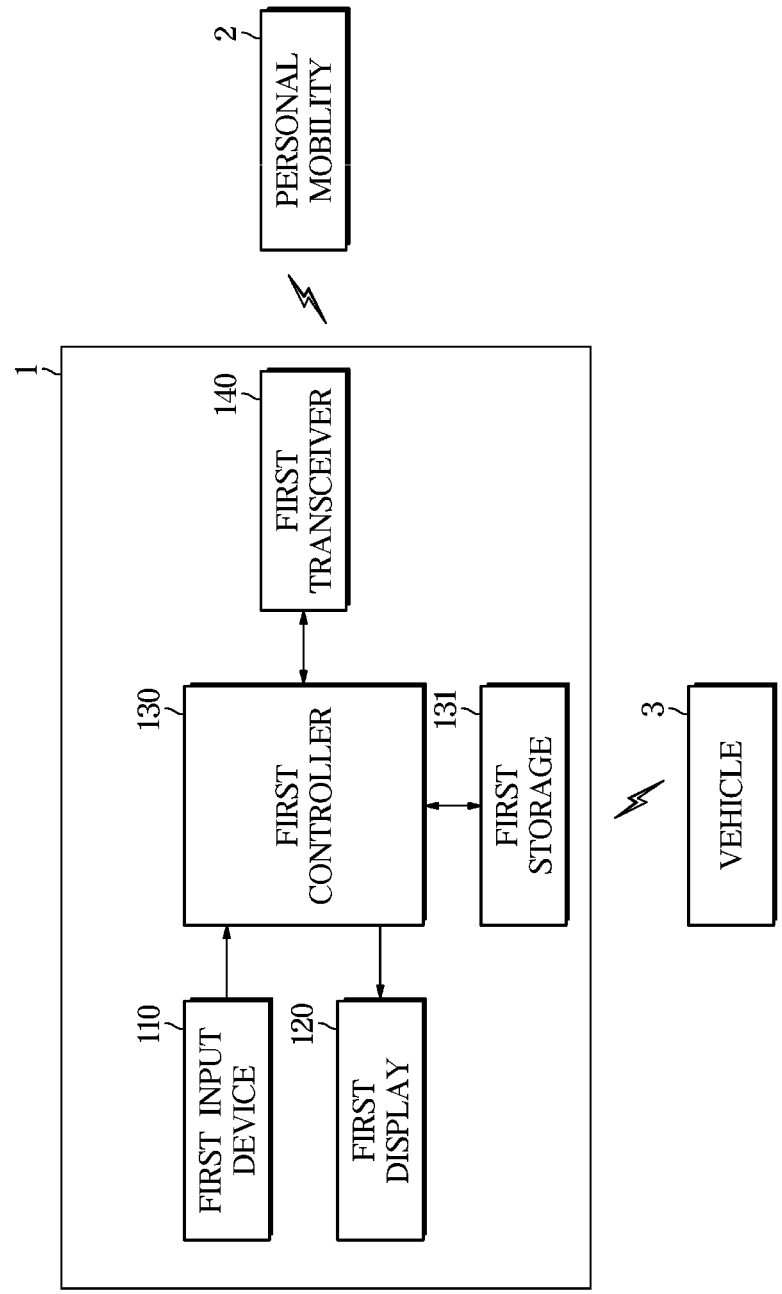
FIG. 1 is a block diagram of a cluster driving system according to an exemplary embodiment.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout. The present disclosure does not describe all elements of the exemplary embodiments, and overlaps between the general contents or the embodiments in the technical field to which the present invention belongs.

This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component, It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network. In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members. The terms first, second, etc. are used to distinguish one component from another component, and the component is not limited by the terms described above. Singular expressions include plural expressions unless the context clearly indicates an exception.

In each step, the identification code is used for convenience of description, and the identification code does not describe the order of each step. Each of the steps may be performed out of the stated order unless the context clearly dictates the specific order. Hereinafter, with reference to the accompanying drawings will be described the working principle and embodiments of the present disclosure.

Figure 4:
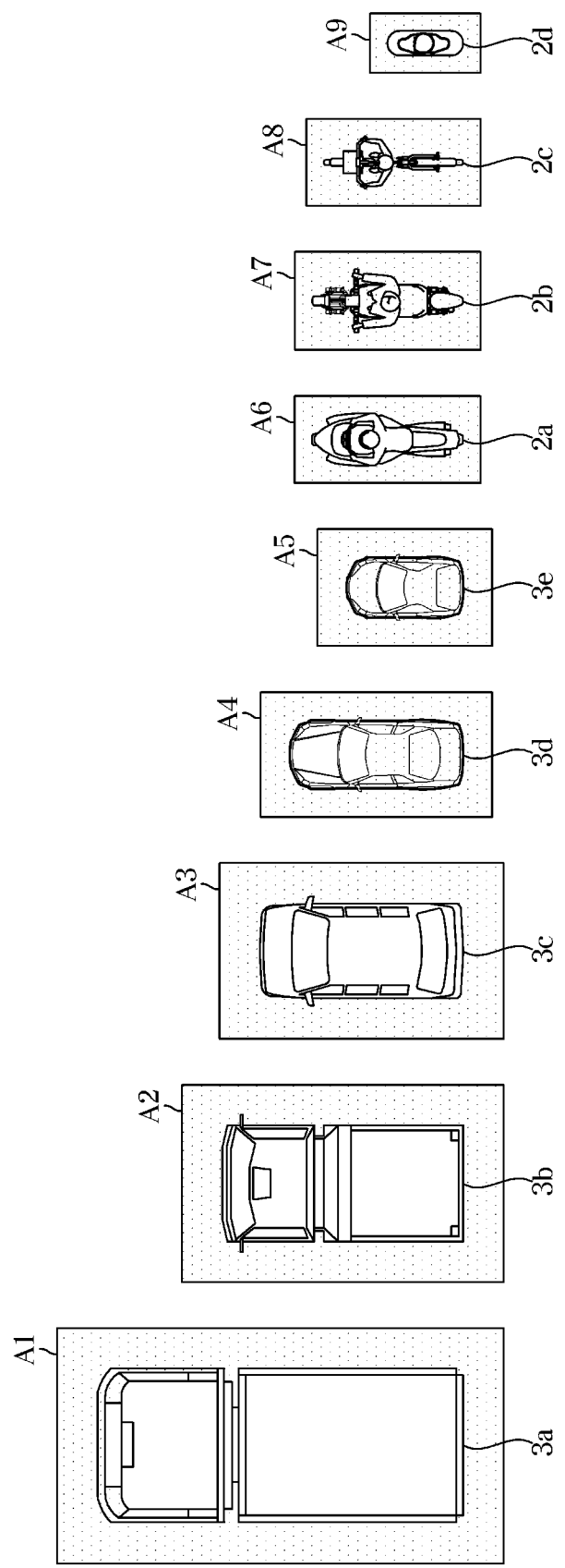
FIG. 4 is an exemplary view of a safety area of a mobile body performing cluster driving in a cluster driving system according to an exemplary embodiment.
Figure 5:
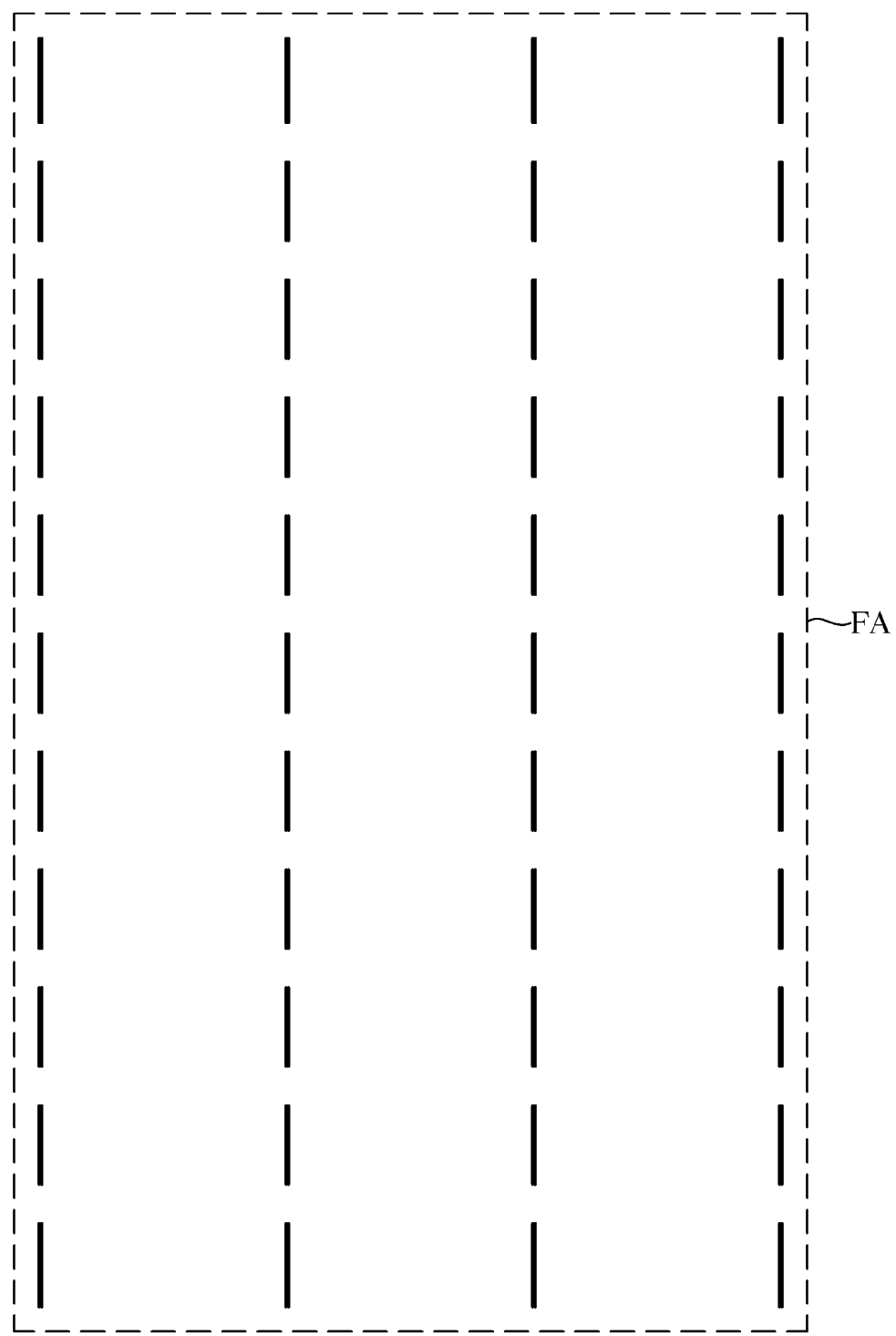
FIG. 5 is an exemplary view of a geo-fence area set by a server in a cluster driving system according to an exemplary embodiment.

FIG. 1 is a block diagram of a cluster driving system according to an exemplary embodiment, and will be described with reference to FIGS. 2A-2D, 3A-3E, 4, and 5. FIGS. 2 and 3 are exemplary views of a mobile body performing cluster driving in a cluster driving system according to an exemplary embodiment. FIG. 4 is an exemplary view of a safety area of a mobile body performing cluster driving in a cluster driving system according to an exemplary embodiment. FIG. 5 is an exemplary view of a geo-fence area set by a server in a cluster driving system according to an exemplary embodiment.

As shown in FIG. 1, the cluster driving system may include a server 1 and a plurality of mobile bodies 2 and 3 that control driving based on driving information transmitted from the server 1. The server 1 may be a server of a company that manufactures and manages personal mobility 2, or may be a server of a company that manufactures and manages vehicle 1. The server 1 may be a server of a sharing service company, a server of a company that guides and controls cluster driving, or a server of a company that provides information for autonomous driving. A plurality of mobile bodies 2, 3 is a device that may be driven manually or automatically, and may include personal mobility 2 and vehicle 3.

As shown in FIGS. 2A-2D, personal mobility 2 is may have a motor and a battery as a power source, may include a scooter-like bike 2a, an electric bicycle 2b, two-wheel kickboard 2c and one-wheel kickboard 2d. The personal mobility 2 may perform at least one of a manual driving mode driving based on a command input by a user and an autonomous driving mode driving autonomously to a destination.

A vehicle is a machine that drives wheels for the purpose of transporting people or cargo. The vehicles may be divided into passenger vehicles, which are used for personal and mobility purposes, and commercial vehicles, which are used for commercial purposes and for the transportation of goods or people. In particular, the commercial vehicle may include a truck for transporting goods, a dump truck, a van, a forklift, a special work vehicle, and a bus and a taxi for transporting people.

As shown in FIGS. 3A-3E, the vehicle may be divided into a large-sized commercial vehicle 3a, a medium-sized commercial vehicle 3b, a large-sized passenger vehicle 3c, a medium-sized passenger vehicle 3d, and a small-sized passenger vehicle 3e according to size. The vehicle includes an internal combustion engine vehicle (general engine vehicle) that generates mechanical power by burning petroleum fuels such as gasoline and diesel, and travels using the mechanical power, and an eco-friendly vehicle travelling using electricity as power to reduce fuel consumption and harmful gas emissions.

An eco-friendly vehicle includes an electric vehicle having a battery and a motor that are rechargeable power sources, and rotates the motor with electricity accumulated in the battery, and drives the wheel using the rotation of the motor, a hybrid vehicle that includes an engine, a battery, and a motor, and adjusts the mechanical power of the engine and the electrical power of the motor to drive and a hydrogen fuel cell vehicle. The vehicle may perform at least one of a manual driving mode for driving based on a command input by a user and an autonomous driving mode for autonomous driving to a destination.

The personal mobility 2 and the vehicle 3 may control autonomous driving based on route information and driving control information transmitted from the server 1 when performing the autonomous driving mode. When performing cluster driving mode, the personal mobility 2 and vehicle 3 may confirm their driving position between mobile bodies performing cluster driving based on the driving location information transmitted from the server 1, and control autonomous driving at the confirmed driving position. The personal mobility for performing cluster driving may be one or multiple, and the vehicle for performing cluster driving may also be one or multiple.

Hereinafter, a detailed configuration of the server 1 for guiding and operating personal mobility 2 and cluster driving of the vehicle 3 will be described. Referring to FIG. 1, the server 1 may include a first input device 110, a first display 120, a first controller 130, a first storage 131, and a first transceiver 140. In addition, to distinguish the components having the same name between the server 1, personal mobility 2, and vehicle 3, the 'first' is written in the component of the server 1, and the 'second' is written in the component of personal mobility 2 and the 'third' is written in the component of the vehicle 3.

The first input device 110 may be configured to receive user input. The first input device 110 may be configured to receive user information of personal mobility 2 for user registration, identification information of personal mobility 2, user information of vehicle 3, and identification information of vehicle. Additionally, the first input device 110 may be configured to receive identification information of a personal mobility 2 and a vehicle for autonomous driving or cluster driving, and may be configured to receive information of an origin and a destination.

The first input device 110 may also include buttons, keys, switches, pedals, levers, jog dials (not shown) or a touch pad. The first input device 110 may also be configured to receive a selection command of a design mode when designing a layout for cluster driving. In particular, the design mode may include a size mode, a safe mode, and an aerodynamic mode depending on conditions that are important.

The first display 120 may be configured to display information of personal mobility 2 and vehicle 3 may be configured to perform cluster driving, and display information regarding the origin and destination of cluster driving and route information about the route of cluster driving. In addition, information regarding the total driving time, the total driving distance, the remaining time, and the remaining distance may be displayed. Information of the personal mobility 2 and the vehicle 3 may include user information, identification information of the personal mobility 2, identification information of the vehicle 3.

The first display 120 may also be configured to display layout information for cluster driving. The first display 120 may also be configured to display a design mode when designing a layout for cluster driving. The first controller 130 may be configured to transmit a cluster driving proposal signal to another mobile body based on the current location information of at least one mobile body when a cluster driving request signal is received from at least one mobile body. In particular, the at least one mobile body may be at least one personal mobility or at least one vehicle.

When transmitting a cluster driving request signal, the first controller 130 may be configured to transmit information of a destination together. The first controller 130 may be configured to transmit a cluster driving proposal signal to another mobile body traveling within a certain distance based on the current location information of at least one mobile body. Additionally, the first controller 130 may be configured to transmit a cluster driving proposal signal to a mobile body capable of autonomous driving among other mobile bodies traveling within a certain distance based on current location information of at least one mobile body.

The first controller 130 may be configured to confirm another mobile body traveling within a certain distance based on the current location information of at least one mobile body, and transmit a cluster driving proposal signal to another mobile body having the same destination among the confirmed another mobile bodies. The first controller 130 may also be configured to determine whether the road of the current location is a road on which autonomous driving is capable of being performed based on current location information of the at least one mobile body and map information when a cluster driving request signal is received from at least one mobile body.

The first controller 130 may be configured to determine whether there is another mobile body that has approved cluster driving in response to transmission of the cluster driving proposal signal. The first controller 130 may be configured to determine whether cluster driving is possible on the road of the current location in response to whether at least one mobile body (e.g., a first mobile body) is personal mobility or vehicle, and in response to whether another mobile body (e.g., a second mobile body) that has approved cluster driving is vehicle or personal mobility.

For example, when at least one mobile body is a personal mobility, and another mobile body that has approved cluster driving is personal mobility, the first controller 130 may be configured to determine whether the road of the current location is a road through which personal mobility may travel, based on current location information and map information of at least one mobile body. When at least one mobile body (e.g., a first mobile body) is a personal mobility, and another mobile body (e.g., a second mobile body) that has approved cluster driving is vehicle, the first controller 130 may be configured to determine whether the road of the current location is a road through which both the personal mobility and the vehicle may travel, based on current location information and map information of at least one mobile body.

When at least one mobile body is vehicle, and another mobile body that has approved cluster driving is personal mobility, the first controller 130 may be configured to determine whether the road of the current location is a road through which both the personal mobility and the vehicle may travel, based on current location information and map information of at least one mobile body. When at least one mobile body is vehicle, and another mobile body that has approved cluster driving is vehicle, the first controller 130 may be configured to determine whether the road of the current location is a road through which the vehicle may travel, based on current location information and map information of at least one mobile body.

The first controller when both vehicle and personal mobility perform cluster driving will be described. The first controller 130 may be configured to confirm the road information in the route information based on the route information in the route from the current location (or origin) to the destination, guide and control cluster driving when the road in the route is a road where both the vehicle and personal mobility that requested and approved cluster driving may drive and a road on which autonomous driving is capable being performed based on the confirmed road information, and when both the vehicle and personal mobility that requested and approved cluster driving may perform the autonomous driving mode.

The first controller 130 may be configured to confirm the identification information of the vehicle and personal mobility that requested and approved cluster driving, respectively, obtain area size information for a safety area of the vehicle based on the confirmed identification information of the vehicle, and obtain area size information for a safety area of personal mobility based on the confirmed identification information of personal mobility.

As shown in FIG. 4, the first controller 130 may be configured to obtain an area size information for a safety area A1 of a large-sized commercial vehicle 3*a*, a safety area A2 of a medium-sized commercial vehicle 3*b*, and a safety area A3 of a large-sized passenger vehicle 3*c*, a safety area A4 of the medium-sized passenger vehicle 3*d* and a safety area A5 of the small-sized passenger vehicle 3*e*. The first controller 130 may be configured to obtain an area size information for a safety area A6 of the bike 2*a*, a safety area A7 of the electric bicycle 2*b*, a safety area A8 of the two-wheel kickboard 2*c*, and a safety area A9 of the one-wheel kickboard 2*d*.

The first controller 130 may be configured to obtain a size of personal mobility and a braking distance of personal mobility based on identification information of personal mobility, and obtain area size information for a safety area of personal mobility based on the obtained size of personal mobility and the braking distance of personal mobility. The first controller 130 may be configured to obtain a size of vehicle and a braking distance of vehicle based on identification information of vehicle, and obtain area size information for a safety area of vehicle based on the obtained size of vehicle and the braking distance of vehicle. For example, the area size when the braking distance of personal mobility is short may be smaller than the area size when the braking distance of personal mobility is long. In addition, the area size when the vehicle braking distance is short may be smaller than the area size when the vehicle braking distance is long.

The first controller 130 may also be configured to obtain area size information corresponding to identification information of the vehicle from information stored in the first storage 131, and obtain area size information corresponding to identification information of personal mobility from information stored in the first storage 131. The first controller 130 may be configured to request to provide area size information for a safety area of a vehicle and personal mobility to perform cluster driving.

As shown in FIG. 5, the first controller 130 may be configured to set the geo-fence area based on the area size information for the safety area of each vehicle to perform cluster driving and the area size information for the safety area of each personal mobility. The first controller 130 may be configured to determine the driving positions of vehicles to perform cluster driving in the set geo-fence area, and in response to determining the driving positions of vehicles, the first controller 130 may be configured to determine the driving positions of personal mobility, respectively, to design layout of the mobile bodies for cluster driving.

The first controller 130 may be configured to set a geo-fence area based on a size information of the plurality of vehicles and a size information of the plurality of personal mobility during cluster driving, determine driving positions of the plurality of vehicles as primary in the set geo-fence area based on the size information of the plurality of vehicles, determine driving positions of the plurality of personal mobility as secondary in the set geo-fence area based on the size information of the plurality of personal mobility and adjust layout information for the driving positions determined as the primary and the secondary to be transmitted to the plurality of vehicles and the plurality of personal mobility.

The design of the layout of mobile bodies for cluster driving will be described with reference to FIGS. 6A, 6B, and 6C. It will be described on the assumption that when the mobile body performing cluster driving is one large-sized commercial vehicle 3a, two medium-sized commercial vehicles 3b, three medium-sized passenger vehicles 3d, three bikes 2a, and two two-wheel kickboards 2c.

Figure 6A:
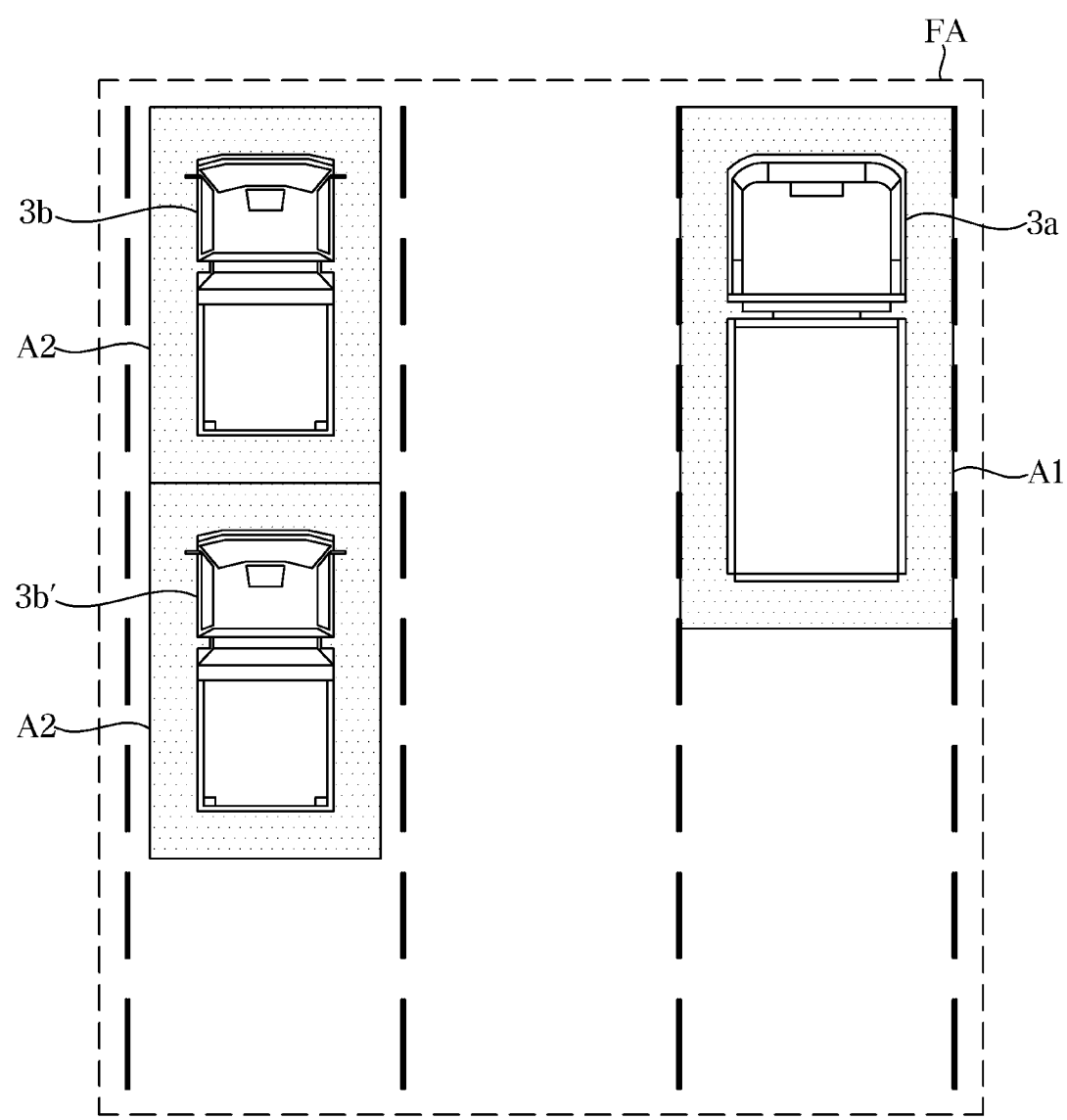
FIGS. 6A, 6B, and 6C are exemplary views of a layout of a server in a cluster driving system according to an exemplary embodiment.

As shown in FIG. 6A, when designing the layout of mobile bodies, the first controller 130 may be configured to place the vehicle 3a having the first largest safety area A1 in the front area of the right lane among the lanes in the geo-fence area, and place the vehicle 3b having the second largest safety area A2 in the front area of the left lane. The first controller 130, when another vehicle 3b' having the second largest safety area A2 is further present, may be configured to determine whether the other vehicle 3b' may be placed in a rear area of the right lane, determine whether it is possible to place in the rear area of the left lane in response to determining that placement in the rear area of the right lane is impossible and place another vehicle 3b' having the second largest safety area A2 in the rear area of the left lane in response to determining that placement is possible in the rear area of the left lane.

The first controller 130 may be configured to compare the size of the rear area of the right lane with the size of the safety area A2 and, in response to determining that the size of the rear area of the right lane is smaller than that of the safety area A2, may be configured to determine that the placement of another vehicle 3b is impossible. The rear area of the right lane may be the area remaining after placing the vehicle 3a (e.g., a first vehicle). In other words, the rear area of the right lane may be an area excluding the safety area A1 among the right lane areas of the geo-fence.

The first controller 130 may be configured to compare the size of the rear area of the left lane with the size of the safety area A2 and, in response to determining that the size of the rear area of the left lane is larger than that of the safety area A2, may be configured to determine that the placement of another vehicle 3b (e.g., a second vehicle) is possible. The first controller 130 may be configured to compare the third largest safety area A4 with the remaining area of the right lane and the remaining area of the left lane among the geo-fence area, and determine whether a vehicle 3d may be placed in the remaining area of the right lane or the remaining area of the left lane. In response to determining that the vehicle 3d may be placed in the remaining area of the right lane, the first controller 130 may be configured to place the vehicle 3d in the remaining area of the right lane. In response to determining that the vehicle 3d is unable to be placed in the remaining area of the right lane, the first controller 130 may be configured to place the vehicle 3d in the remaining area of the left lane.

Figure 6B:
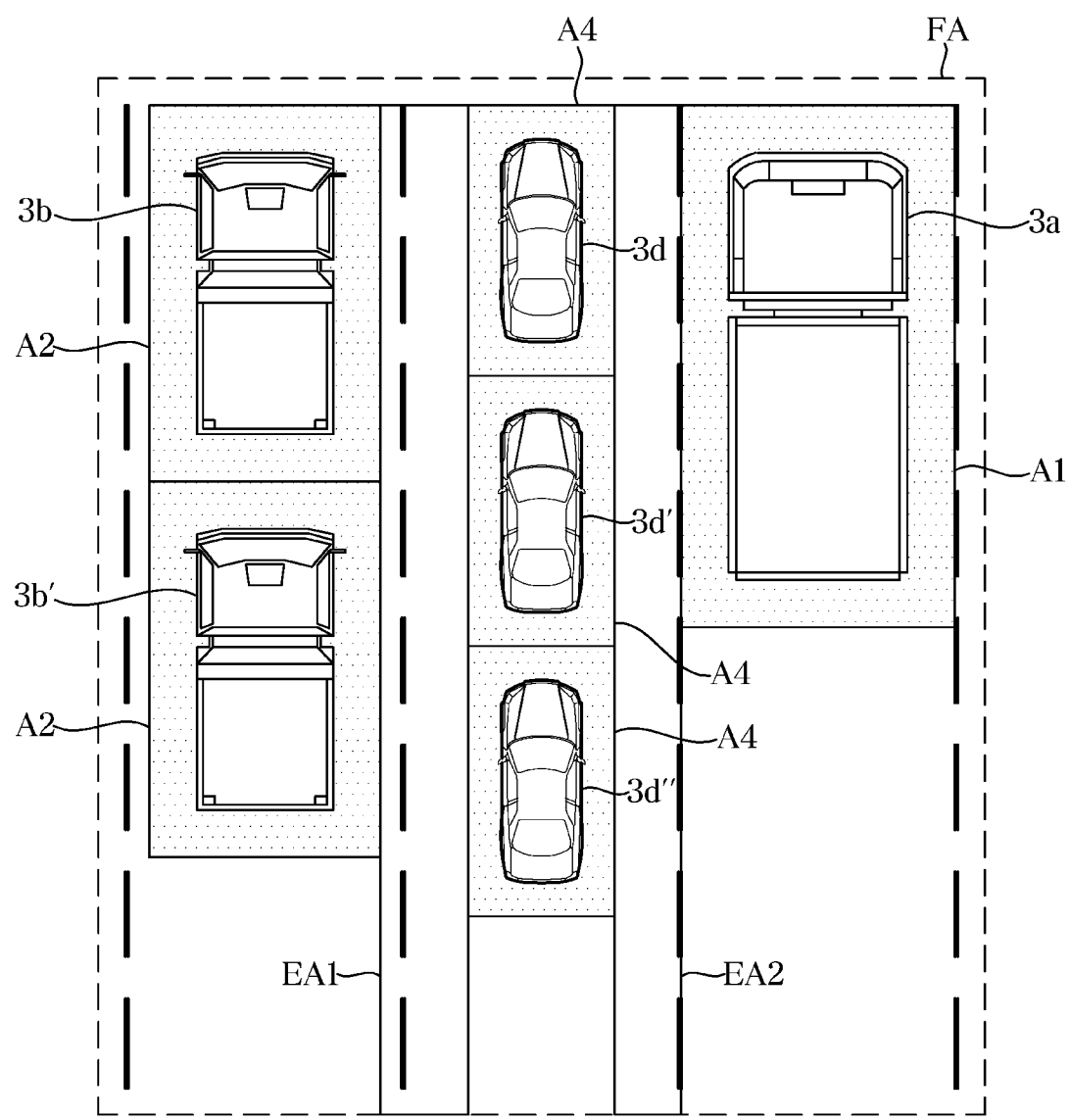

As shown in FIG. 6B, in response to determining that the vehicle 3d is unable to be placed in the remaining area of the right lane or the remaining area of the right lane, the first controller 130 may be configured to place the vehicle 3d having the third largest safety area A4 in the front area of the central lane among the geo-fence areas. Here, the central lane may be one or two lanes.

The first controller 130, in response to determining that other vehicle 3d' (e.g., third vehicle) having the third largest safety area A4 is further present, may be configured to place other vehicle 3d' in some of the remaining areas of the central lane. The first controller 130, in response to determining that another vehicle 3d' having the third largest safety area A4 is further present, may be configured to place another vehicle 3d' in the remaining area of the central lane. The first controller 130 may be configured to obtain driving positions of all vehicles when all vehicles are placed in the geo-fence area.

Figure 6C:
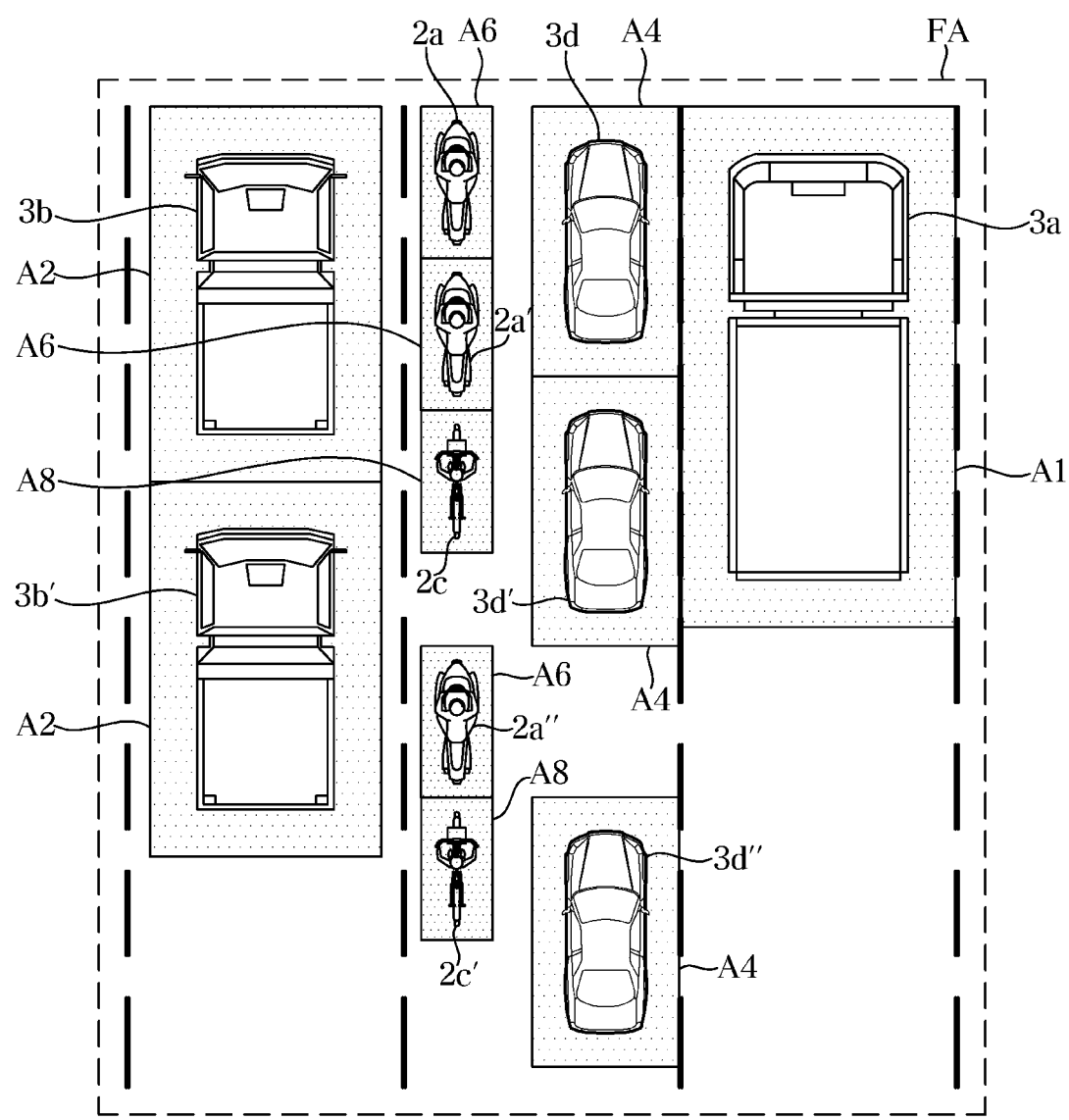

As shown in FIG. 6C, the first controller 130 may be configured to obtain the remaining areas EA1 and EA2 after the vehicle is placed among the geo-fence areas and places three bikes 2a and two two-wheel kickboards 2c in the remaining areas. In particular, the remaining areas EA1 and EA2 after the vehicle is placed may be left and right areas between the vehicles. The first controller 130 may be configured to sequentially place personal mobility having a large safety area based on area size information of the safety area of the three bikes 2a and two two-wheeled kickboards 2c from the front area.

Considering the safety of vehicle and personal mobility, the first controller 130 may be configured to adjust the driving position of vehicles 2d, 2d', 2d'' placed in the central lane by a certain distance in the opposite direction in which personal mobility is placed. For example, when placing personal mobility in the remaining area EA1 on the right, the first controller 130 may be configured to move the driving position of the vehicle 2d, 2d', 2d'' placed in the central lane to the right by a certain distance. When placing personal mobility in the remaining area on the right EA2, the first controller 130 may be configured to move the driving position of vehicles 2d, 2d', 2d'' placed in the central lane to the left by a certain distance.

The first controller 130 may be configured to confirm the size of the remaining areas behind the left lane, behind the central lane, and behind the left lane among the geo-fence area after all vehicles are placed in the geo-fence area, and may also be configured to adjust the interval between the front and rear of vehicles placed in each lane based on the confirmed information on size. For example, the first controller 130 may be configured to adjust the interval between the vehicle 3d' and the vehicle 3d" placed in the central lane of the geo-fence area.

Figure 7A:
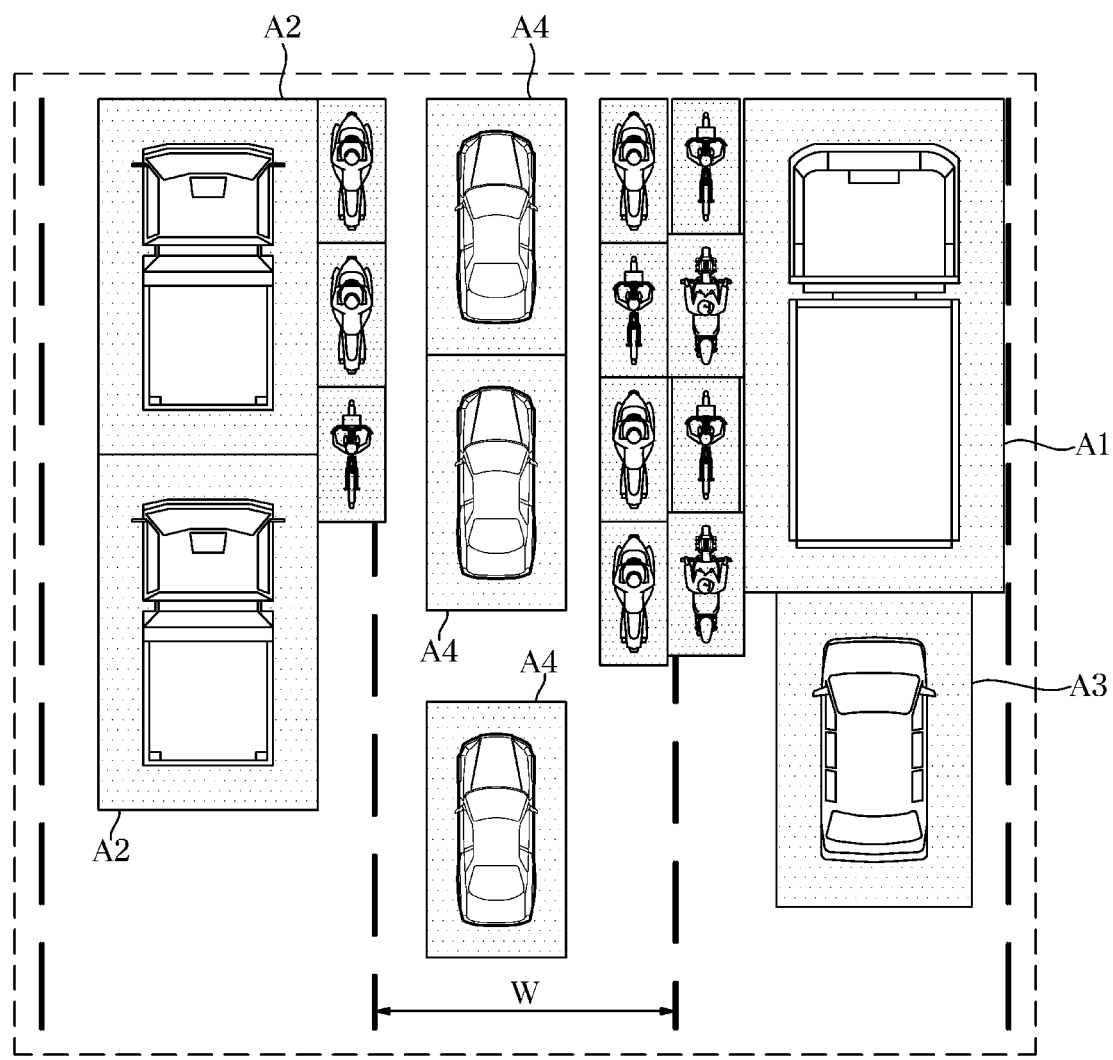
FIG. 7A is an exemplary view of a layout based on the lane width of a server in a cluster driving system according to an exemplary embodiment.

An example of designing the layout of mobile bodies based on the lane width and the number of lanes will be described with reference to FIGS. 7A and 7B. As shown in FIG. 7A, the first controller 130 may be configured to obtain lane width information of the road based on map information and current location information and place personal mobility in two rows between vehicles respectively placed in two adjacent lanes in response to determining that the lane width W of the road is equal to or greater than the reference width based on the obtained lane width information.

Figure 7B:
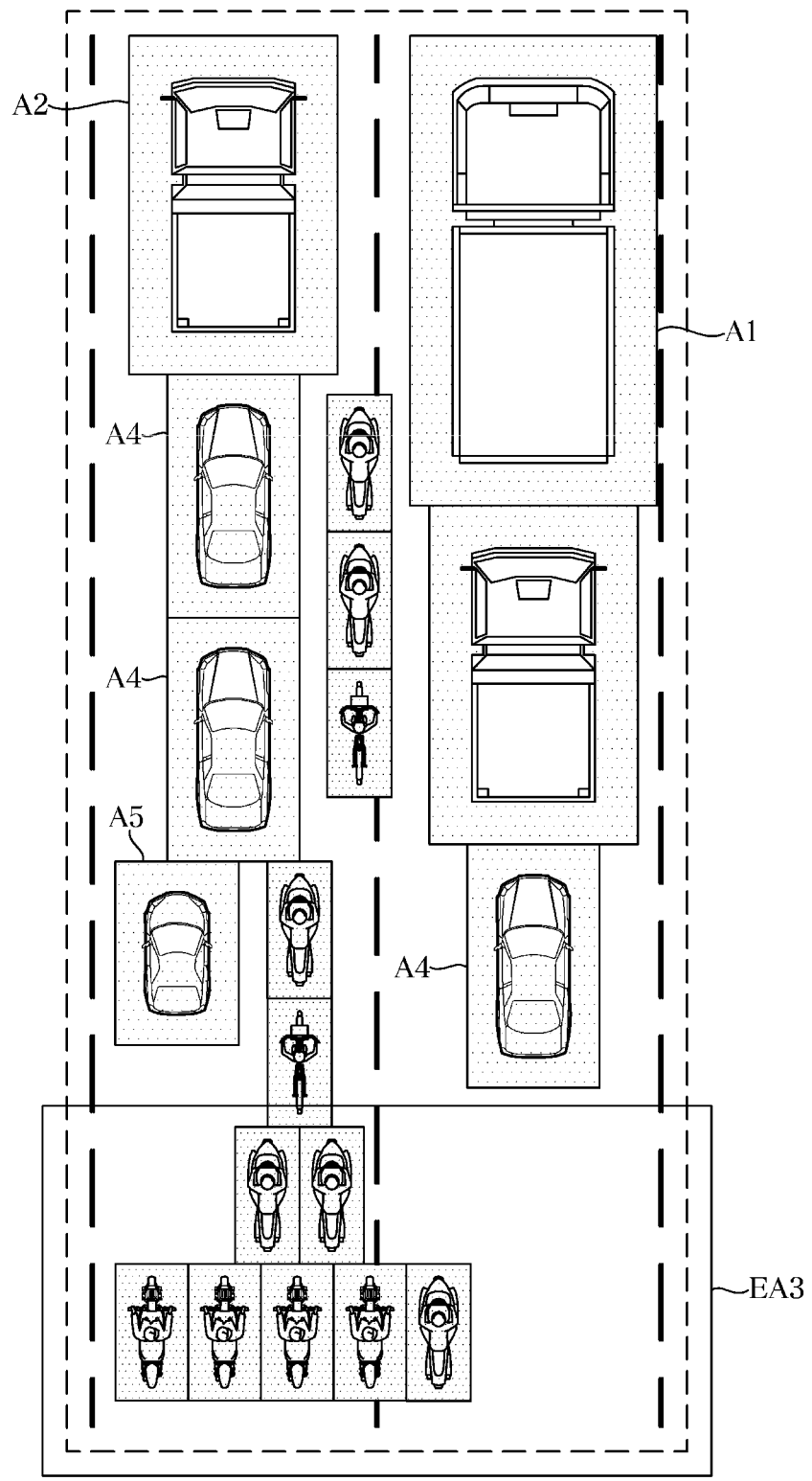
FIG. 7B is an exemplary view of a layout based on the number of lanes of a server in a cluster driving system according to an exemplary embodiment.

As shown in FIG. 7B, the first controller 130 may be configured to obtain lane width information of the road based on map information and current location information and place personal mobility in two or more rows in a rear area EA3 remaining after the vehicle is placed among the geo-fence areas in response to determining that the lane width W of the road is less than the reference width or the number of lanes is less than the reference number based on the obtained lane width information. As shown in FIG. 7B, in response to determining that the number of lanes is less than the reference number, the first controller 130 may be configured to confirm the lane in which a vehicle having a safety area (e.g., A4) less than a predetermined size is placed, and may also be configured to place personal mobility in and around the confirmed lane.

When the design mode selected during layout design is the size mode, the first controller 130 may be configured to design the layout based on the size of the vehicle and personal mobility performing cluster driving (see FIGS. 6A, 6B, 6C, 7A, 7B). An example of designing the layout of mobile bodies corresponding to the design mode will be described with reference to FIGS. 8 and 9.

Figure 8:
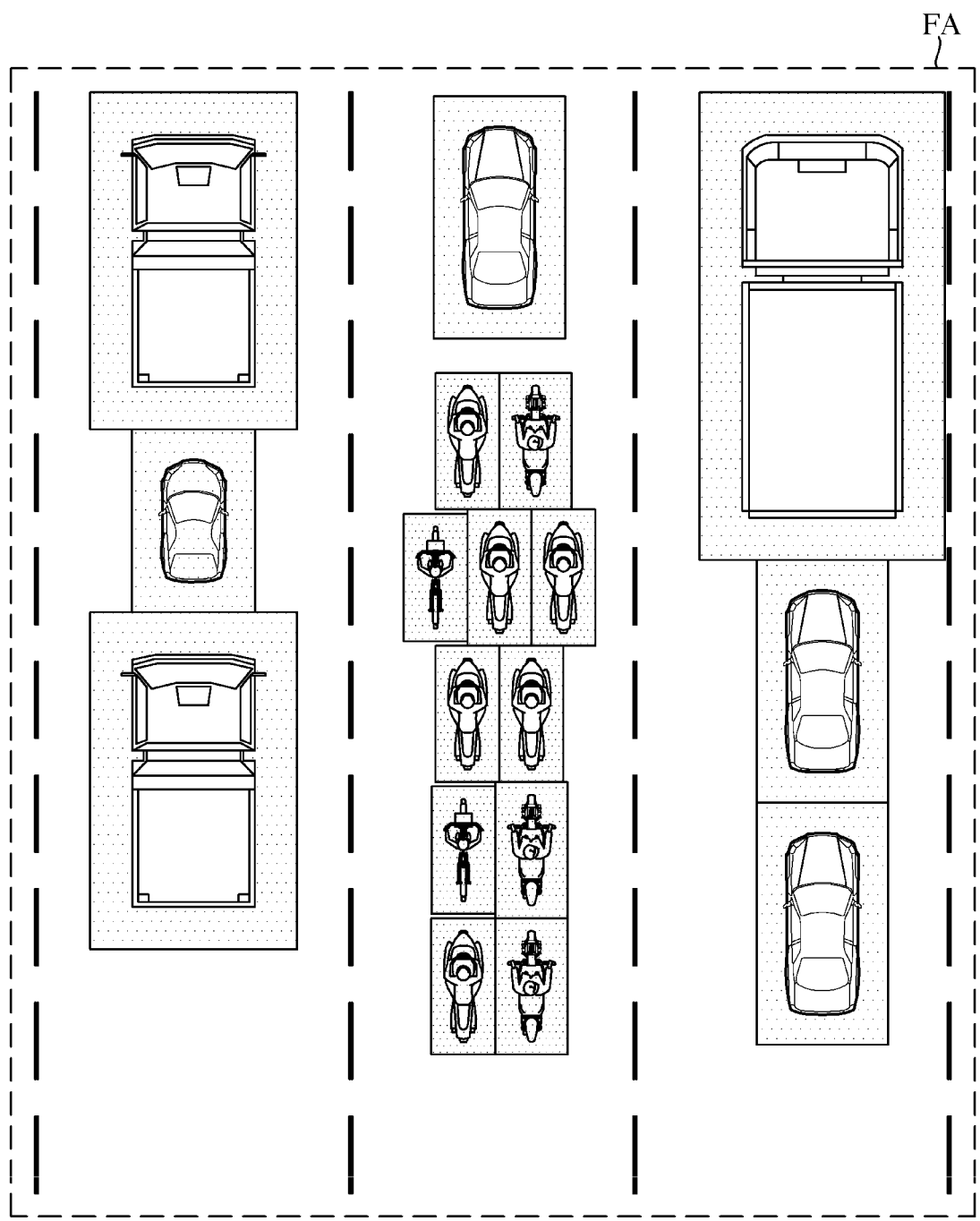
FIG. 8 is an exemplary view of a layout based on a safe mode of a server in a cluster driving system according to an exemplary embodiment.

As shown in FIG. 8, when the design mode selected during layout design is safe mode, first controller 130 may be configured to set a geo-fence area based on the size of a vehicle and a personal mobility performing cluster driving, place the vehicle from the front area to the rear area of the right lane based on the area size information of the vehicle's safety area and then place the vehicle from the front area to the rear area of the left lane. Then, the first controller 130 may be configured to place personal mobility in the central lane area of the geo-fence area when all vehicles are placed.

When there are more vehicles to be placed with vehicles placed in the left and right lanes of the geo-fence area, the first controller 130 may be configured to first place the vehicle in the front area of the central lane of the geo-fence area, and then place the vehicle in the rear area of the central lane of the geo-fence area. In other words, when the design mode selected during layout design is the safe mode, the first controller 130 may be configured to place the vehicle on the border side of the geo-fence area and personal mobility in the center of the geo-fence area.

Figure 9:
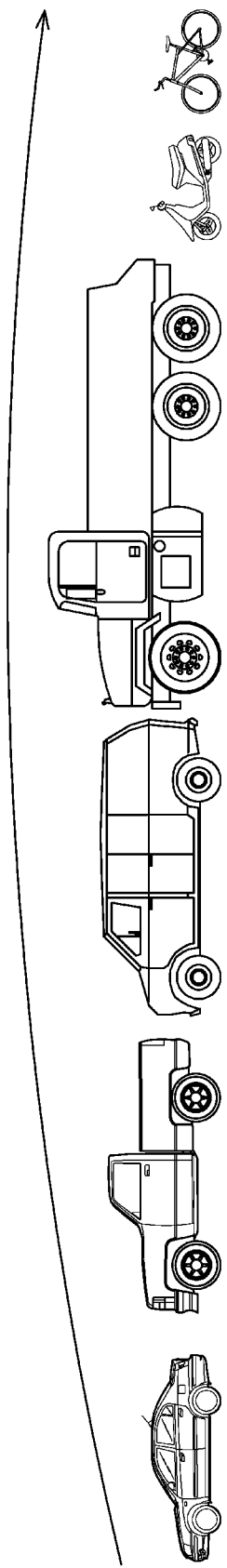
FIG. 9 is an exemplary view of a layout based on an aerodynamic mode of a server in a cluster driving system according to an exemplary embodiment.

When the layout design is completed, the first controller 130 may be configured to determine driving positions of vehicles performing cluster driving and personal mobility. As shown in FIG. 9, when the design mode selected during layout design is an aerodynamic mode, the first controller may be configured to place the vehicle with the smallest size among the vehicles at the front, place the vehicle with the largest size at the rear, and then place personal mobility behind the vehicle with the largest size based on the size information of the vehicle performing clustering mode and the size information of personal mobility.

Accordingly, it may be possible to increase the fuel efficiency of cluster driving by increasing the efficiency of aerodynamics. In addition, when the size of the vehicle is less than the reference size, the first controller 130 may be configured to place the vehicle less than the reference size behind the largest vehicle and place personal mobility behind the vehicle less than a reference size. This allows vehicle and personal mobility less than the reference size to avoid wind.

When the driving position of the vehicle and personal mobility performing cluster driving is determined, the first controller 130 may be configured to store driving location information for the determined driving position and transmit driving location information to the vehicle and personal mobility. The first storage 131 may be configured to store user information of a registered user. The first storage 131 may also be configured to store identification information of personal mobility 2 possessed by each user and identification information of a vehicle.

The identification information of personal mobility 2 may further include type information, model information, and size information of personal mobility. The size information of personal mobility may include horizontal, vertical, and height information. The identification information of vehicle may include type information, model information, and size information of vehicle. The size information of vehicle may include horizontal, vertical, and height information.

The first storage 131 may be configured to store layout information, information regarding an origin and destination, and store route information about cluster driving. The first storage 131 may be configured to store area size information for a safety area for each size of personal mobility and area size information for a safety area for each size of a vehicle. In particular, area size information for each size of personal mobility may be different according to a braking distance of personal mobility. Area size information for each size of vehicle may be different according to a braking distance of the vehicle.

The area size information of the safety area of personal mobility may be set according to the size of personal mobility and the braking distance of personal mobility, and may be preset information. The area size information of the safety area of the vehicle may be set according to the size of the vehicle and the braking distance of the vehicle, and may be preset information. In other words, the first storage 131 may be configured to store area size information of the safety area for the size and the braking distance of personal mobility, and area size information of the safety area for the size and the safety area of the vehicle.

The first storage 131 may be configured to store area size information for a safety area for each type of personal mobility and area size information for a safety area for each type of vehicle. The first storage 131 may be configured to store area size information for a safety area for each type of personal mobility and area size information for a safety area for each type of vehicle. The first storage 131 may be configured to store map information, information regarding the lane width of the road and the number of lanes in the map information, and information regarding the reference lane width, the reference lane number, and the vehicle reference size. The first storage 131 may be configured to receive and store identification information of a vehicle performing cluster driving. In particular, the vehicles performing cluster driving may be vehicles having the same destination from a current location (or origin).

The first transceiver 140 may be configured to perform communication with personal mobility and the vehicle. Additionally, the first transceiver 140 may be configured to receive user information of personal mobility 2 for user registration, identification information of personal mobility 2, user information of vehicle 3, and identification information of vehicle. The first transceiver 140 may be configured to receive identification information of a vehicle and personal mobility 2 for autonomous driving or cluster driving and, and may be configured to receive information of an origin and destination.

The first transceiver 140 may also be configured to perform communication with a user terminal. The first transceiver 140 may be configured to receive user information of personal mobility 2, identification information of personal mobility 2, user information of vehicle 3, and identification information of vehicle transmitted from the user terminal. In addition, the first transceiver 140 may be configured to transmit driving location information (e.g., layout information) to a plurality of personal mobility 2 and a plurality of vehicles 3 in response to a control command of the first controller. In other words, the first transceiver 140 may be configured to transmit driving location information to personal mobility 2 and vehicle 3 performing cluster driving. This server 1 may also be configured to perform communication with vehicle and personal mobility through the infrastructure of the road.

Figure 10:
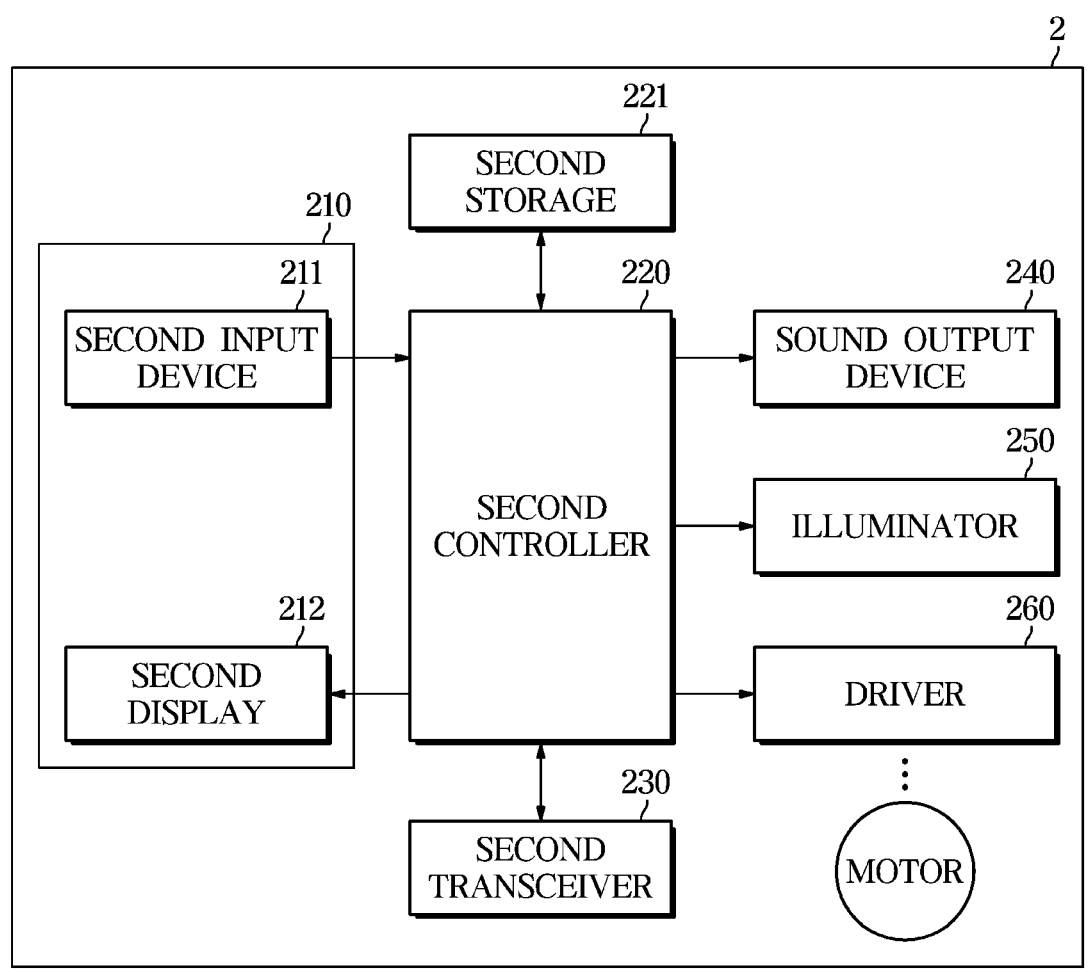
FIG. 10 is a control block diagram of personal mobility in a cluster driving system according to an exemplary embodiment.

FIG. 10 is a control block diagram of personal mobility in a cluster driving system according to an exemplary embodiment. The personal mobility 2 may include a driving device such as a power generating device, a braking device, and a steering device for applying a driving force and a braking force to one or a plurality of wheels. In addition, the power generating device may include a battery and a motor.

The personal mobility 2 may include the user interface 210, the second controller 220, the second storage 221, the second transceiver 230, the sound output device 240, the illuminator 250, and the driver 260. The user interface 210 may be configured to receive operation commands for various functions performed in personal mobility, and may be configured to display information on various functions performed in personal mobility. In other words, the user interface 210 may be configured to receive user input for at least one of a navigation function, an audio function, a video function, a radio function, a web search function, a broadcasting function (e.g., a DMB function), and an Internet function, and display information about at least one function in action.

The user interface 210 may include a second input device 211 and a second display 212. The second input device 211 may be configured to receive a driving on/off command, a command for cluster driving mode, and may be configured to receive a command for autonomous driving mode. The second input device 211 may be configured to receive information on a destination. Additionally, the second input device 211 may be configured to receive an approval command corresponding to the cluster driving proposal. The second input device 211 may include hardware devices such as various buttons, switches, keyboards, track-balls, and sticks.

Further, the second input device 211 may include a graphical user interface (GUI) such as a touch pad for user input, that is, may include a software-like device. The touch pad may be implemented as a touch screen panel (TSP) to form a layer structure with the second display 212. When performing a navigation function, the second display 212 may be configured to display at least one of map information, route information, current location information, driving speed information, destination information, and traffic information as an image. The second display 212 may be configured to display a driving time, a time remaining to a destination, a current time, and the like.

Additionally, the second display 212 may be configured to display information corresponding to the cluster driving proposal. The second display 212 may be configured to display layout information of mobile bodies performing cluster driving, and may display driving location information of personal mobility. When a command of the cluster driving mode is received through the second input device 211, the second controller 220 may be configured to transmit a cluster driving request signal, personal mobility identification information, and current location information to the server 1. When an approval command is received in response to the cluster driving proposal, the second controller 220 may be configured to transmit an approval signal for the received approval command, personal mobility identification information, and current location information to the server 1.

The second controller 220 may be configured to operate the display of the received layout information when the layout information is received from the server 1, and may be configured to adjust movement from a current location to a driving position based on the received layout information, driving location information of personal mobility, and current location information. The second controller 220 may be configured to confirm the received layout information, identification information of other personal mobility, and identification information of the vehicle, and may be configured to adjust movement from a current location to a driving position based on the confirmed identification information of other personal mobility and identification information of the vehicle.

The second controller 220 may be configured to execute autonomous driving toward a destination while maintaining a driving position among other mobile bodies performing cluster driving. The second controller 220 may be configured to adjust power supplied to the motor by comparing the driving speed of personal mobility 2 with the target speed. When the navigation function is selected and destination information is input, the second controller 220 may be configured to generate route information based on current location information and destination information, match the generated route information to the map information, and adjust outputs of the matched map information and route information. When generating route information, the second controller 220 may be configured to generate optimal route information using traffic information.

The second controller 220 may be implemented as a memory (not shown) configured to store data about an algorithm for executing the operation of components in the personal mobility 2 or a program that reproduces the algorithm, and a processor (not shown) configured to perform the above-described operation using data stored in a memory. In particular, each of the memory and the processor may be implemented as separate chips. Alternatively, the memory and the processor may be implemented as a single chip. The second storage 221 may be configured to store identification information of personal mobility. The identification information of personal mobility may include model information, size information, and type information of personal mobility.

The second storage 221 is a nonvolatile memory device such as cache, read only memory (ROM), programmable ROM (PROM), erasable programmable ROM (EPROM), electrically erasable programmable ROM (EPMROM), and flash memory or random access memory (RAM) Access Memory) may be implemented as a volatile memory device, but is not limited thereto. The second storage 221 may be a memory implemented in a separate chip from the processor described above with respect to the second controller 220, or may be implemented in a single chip with the processor.

The second transceiver 230 may be configured to communicate with the server 1 and other personal mobility and vehicle 3. The second transceiver 230 may further include a GPS receiver configured to obtain a current location of personal mobility 1. The Global Positioning System (GPS) receiver may include an antenna module for receiving signals from a plurality of GPS satellites, and may include software that obtains a current position using distance and time information corresponding to position signals of a plurality of GPS satellites, and an output device configured to output the obtained position data of the vehicle.

The sound output device 240 may be configured to output a sound that corresponds to a control command of the second controller 220. The sound output device 240 may include a speaker. The sound output device 240 may be configured to output navigation information as sound when performing a navigation function. The illuminator 250 may include at least one light source. The illuminator 250 may make it easier to see all information around personal mobility while looking forward. The illuminator 250 may be configured to perform a lighting function and also a signal and communication function for other vehicles and pedestrians.

The illuminator 250 may be disposed on the front and rear surfaces of the board for personal mobility, and may include a light for illuminating a long distance, a short distance, and a rear, and a signal light indicating a braking, turning direction, and an emergency situation. The driver 260 may be configured to operate the motor in response to a control command from the second controller 220. Personal mobility may further include an image acquisition device and an obstacle detector may be configured to obtain road information for autonomous driving.

At least one component may be added or deleted corresponding to the performance of the components of personal mobility illustrated in FIG. 10. In addition, it will be readily understood by those of ordinary skill in the art that the mutual positions of the components may be changed corresponding to the performance or structure of the system. Meanwhile, each component shown in FIG. 10 refers to software and/or hardware components such as a Field Programmable Gate Array (FPGA) and an Application Specific Integrated Circuit (ASIC).

Figure 11:
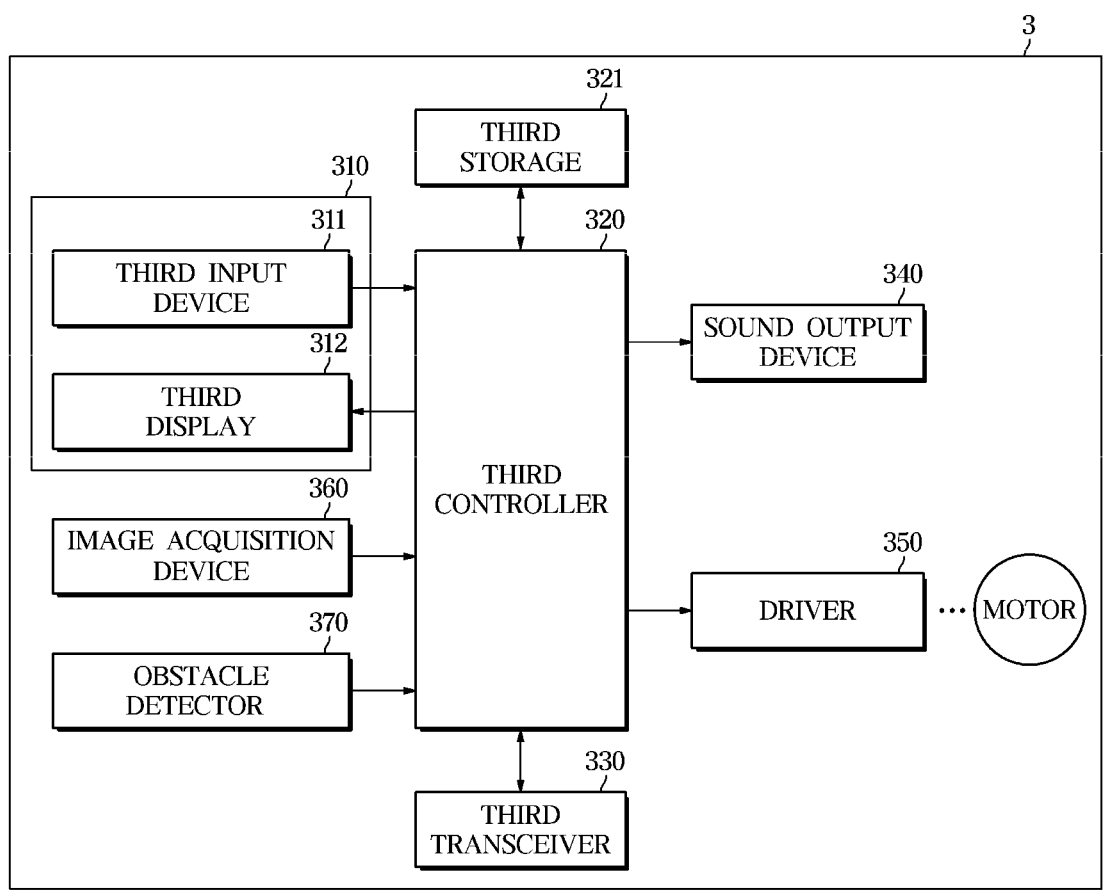
FIG. 11 is a control block diagram of a vehicle in a cluster driving system according to an exemplary embodiment.

FIG. 11 is a control block diagram of a vehicle in a cluster driving system according to an exemplary embodiment. The control configuration of an eco-friendly vehicle will be described as an example. The vehicle 3 may include a driving device such as a power generating device, a braking device, and a steering device for applying a driving force and a braking force to a plurality of wheels. In addition, the power generating device may include a battery and a motor.

The vehicle 3 may include a user interface 310, a third controller 320, a third storage 321, a third transceiver 330, a sound output device 340, a driver 350, an image acquisition device 360, and an obstacle detector 370. The user interface 310 may be configured to receive operation commands for various functions performed in vehicle, and may display information on various functions performed in vehicle. In other words, the user interface 310 may be configured to receive user input for at least one of a navigation function, an audio function, a video function, a radio function, a web search function, a broadcasting function (e.g., a DMB function), and an Internet function, and display information about at least one function in action.

The user interface 310 may include a third input device 311 and a third display 312. The third input device 311 may be configured to receive a command for a manual driving mode, an autonomous driving mode, a start-on-off command, and a cluster driving mode. The third input device 311 may be configured to receive information regarding a destination in a navigation mode or an autonomous driving mode. The third input device 311 may be configured to receive an approval command corresponding to the cluster driving proposal.

The third input device 311 may include hardware devices such as various buttons, switches, keyboards, track-balls, and sticks. In addition, the third input device 311 may include a graphical user interface (GUI) such as a touch pad for user input, that is, may include a software-like device. The touch pad may be implemented as a touch screen panel (TSP) to form a layer structure with the second display 312.

When performing a navigation function, the third display 312 may be configured to display at least one of map information, route information, current location information, driving speed information, destination information, and traffic information as an image. The third display 312 may be configured to display a driving time, a time remaining to a destination, a current time, and the like.

The third display 312 may be configured to display information corresponding to the cluster driving proposal. The third display 312 may be configured to display layout information of mobile bodies performing cluster driving, and display driving location information of personal mobility. In response to receiving a command of the cluster driving mode from the third input device 311, the third controller 320 may be configured to transmit a cluster driving request signal, vehicle identification information, and current location information to the server 1. In response to receiving an approval command in response to the cluster driving proposal, the third controller 320 may be configured to transmit the received approval command, vehicle identification information, and current location information to the server 1.

The third controller 320 may be configured to operate the display of the received layout information when the layout information is received from the server 1, and adjust movement from a current location to a driving position based on the received layout information, driving location information of the subject vehicle, and current location information of the subject vehicle. The third controller 320 may be configured to confirm the received layout information, identification information of personal mobility, and identification information of the other vehicle (e.g., second vehicle), and may be configured to adjust movement from a current location to a driving position based on the confirmed identification information of personal mobility and identification information of the other vehicle.

The third controller 320 may be configured to execute autonomous driving toward a destination while maintaining a driving position among other mobile bodies performing cluster driving. The third controller 320 may be configured to adjust power supplied to the motor by comparing the driving speed of the subject vehicle with the target speed. When navigation mode or autonomous driving mode is selected and destination information is input, the third controller 320 may be configured to generate route information based on current location information and destination information, matches the generated route information to the map information, and adjust outputs of the matched map information and route information. When generating route information, the third controller 320 may be configured to generate optimal route information using traffic information.

In autonomous driving mode or cluster driving mode, the third controller 320 may be configured to recognize the lane based on the image obtained by the image acquisition device, allow the vehicle to drive in a driving position determined among the lanes in which the subject vehicle is traveling based on the recognized lane information and driving location information, and allow the vehicle to drive while maintaining the distance to the obstacle based on the obstacle detection information detected by the obstacle detector.

The third controller 320 may be configured to recognize an obstacle based on the image obtained by the image acquisition device in the autonomous driving mode or the cluster driving mode. The third controller 320 may be configured to recognize obstacles and lanes based on images obtained by the image acquisition device in autonomous driving mode or cluster driving mode, and also recognize the driving position of the subject vehicle based on the recognized obstacle information, lane information, and layout information.

The third controller 320 may be implemented as a memory (not shown) configured to store data about an algorithm for executing the operation of components in the vehicle or a program that reproduces the algorithm, and a processor (not shown) configured to perform the above-described operation using data stored in a memory. In particular, each of the memory and the processor may be implemented as separate chips. Alternatively, the memory and the processor may be implemented as a single chip. The third storage 321 may be configured to store identification information of the subject vehicle.

Vehicle identification information may include vehicle model information, size information, and type information. The third storage 321 is a nonvolatile memory device such as cache, read only memory (ROM), programmable ROM (PROM), erasable programmable ROM (EPROM), electrically erasable programmable ROM (EPMROM), and flash memory or random access memory (RAM) Access Memory) may be implemented as a volatile memory device, but is not limited thereto. The third storage 321 may be a memory implemented in a separate chip from the processor described above with respect to the second controller 320, or may be implemented in a single chip with the processor.

The third transceiver 330 may be configured to communicate with the server 1 and personal mobility and the other vehicle (e.g., second vehicle). The third transceiver 330 may further include a GPS receiver configured to obtain a current location of own vehicle 1. The Global Positioning System (GPS) receiver may include an antenna module configured to receive signals from a plurality of GPS satellites, and may include software that obtains a current position using distance and time information corresponding to position signals of a plurality of GPS satellites, and an output device configured to output the obtained position data of the vehicle.

The sound output device 340 may be configured to output a sound corresponding to the control command of the third controller 320. The sound output device 340 may include a speaker. The sound output device 340 may be configured to output navigation information as sound when performing a navigation function, and may be configured to output a warning sound for departure from a driving position. The driver 350 may be configured to operate the motor in response to a control command from the third controller 320.

The image acquisition device 360 may be configured to obtain an image of the road and transmit the obtained image to the third controller 320. In particular, the image of the road may be an image of the road in the forward direction based on the driving direction of the subject vehicle. The image acquisition device 360 is a camera, and may include a CCD or CMOS image sensor.

The obstacle detector 370 may be configured to detect the presence and distance of other vehicles, personal mobility, and other obstacles. The obstacle detector 370 may include at least one of a radar sensor, a LiDAR (Light Detection And Ranging) sensor, and an ultrasonic sensor. At least one component may be added or deleted corresponding to the performance of the components of vehicle illustrated in FIG. 11. In addition, it will be readily understood by those of ordinary skill in the art that the mutual positions of the components may be changed corresponding to the performance or structure of the system.

Meanwhile, each component shown in FIG. 11 refers to software and/or hardware components such as a Field Programmable Gate Array (FPGA) and an Application Specific Integrated Circuit (ASIC). Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all types of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

When vehicle and personal mobility perform cluster driving together, the present disclosure may improve driving safety of personal mobility and improve driving efficiency by determining driving positions of vehicles and personal mobility based on the size of the vehicle and the size of personal mobility. When vehicle and personal mobility perform cluster driving together, the present disclosure may improve aerodynamic efficiency by determining the driving position of the vehicle and personal mobility based on the size of the vehicle and the size of personal mobility, thereby improving fuel efficiency. When vehicle and personal mobility perform cluster driving together, the present disclosure may improve driving safety of personal mobility by determining the driving position of personal mobility as an area between vehicles. The present disclosure may improve the quality and productibility of personal mobility, further increase the user's satisfaction and secure the competitiveness of the product.

What is claimed is:

1. A server, comprising:
a transceiver configured to communicate with a plurality of vehicles and a plurality of personal mobility; and a controller configured to;
obtain area size information for each of the plurality of vehicles based on a size information of each vehicle and a braking distance of each vehicle;
obtain area size information of a safety area for each of the plurality of personal mobility based on a size information of each of the personal mobility and a braking distance of each of the personal mobility;
set a geo-fence area based on the obtained area size information of the safety area for each of the plurality of vehicles and the obtained size information for each of the personal mobility during cluster driving;
determine driving positions of the plurality of vehicles as primary in the set geo-fence area based on the size information of the plurality of vehicles;
determine driving positions of the plurality of personal mobility as secondary in the set geo-fence area based on the size information of the plurality of personal mobility; and
adjust layout information for the driving positions determined as the primary and the secondary to be transmitted to the plurality of vehicles and the plurality of personal mobility;
wherein, for each personal mobility, the personal mobility safety area when the personal mobility braking distance is short is smaller than the personal mobility safety area when the personal mobility braking distance is long, the short personal mobility braking distance being less than the long personal mobility braking distance; and
wherein, for each vehicle, the vehicle safety area when the vehicle braking distance is short is smaller than the vehicle safety area when the vehicle braking distance is long, the short vehicle braking distance being less than the long vehicle braking distance.

2. The server according to claim 1, wherein the transceiver is configured to receive the size information of the plurality of vehicles and the size information of the plurality of personal mobility.

3. The server according to claim 1, further comprising:
a storage configured to store size information for each vehicle and size information for each personal mobility, and
wherein the controller, in response to receiving identification information of each vehicle and identification information of each personal mobility from the transceiver, is configured to confirm the size information of each vehicle corresponding to the received identification information of each vehicle and the size information of each personal mobility corresponding to the identification information of each personal mobility from the information stored in the storage.

4. The server according to claim 1, wherein, in response to receiving a cluster driving request signal and current location information from at least one vehicle or personal mobility, the controller is configured to transmit a cluster driving proposal signal to a vehicle and personal mobility existing within a certain distance from a current location among the plurality of vehicles and the plurality of personal mobility based on the received current location information and determine a driving position for a vehicle or personal mobility that transmitted an approval signal for cluster driving.

5. The server according to claim 4, wherein the controller is configured to determine whether a road of a current location is a road on which both a vehicle and a personal mobility are capable of driving based on the current location information and map information when a vehicle and personal mobility are included in a target for performing cluster driving.

6. The server according to claim 4, wherein the controller is configured to determine whether a road of a current location is a road on which autonomous driving is capable of being performed based on the current location information and map information during the cluster driving.

7. The server according to claim 1, wherein, when placing the plurality of vehicles in the geo-fence area to determine the driving position of the plurality of vehicles as primary, the controller is configured to place a vehicle from a front area to a rear area one of a left lane and a right lane among the lanes in the geo-fence area after placing a vehicle from a front area to a rear area of the other of the left lane and the right lane among the lanes in the geo-fence area.

8. The server according to claim 7, wherein, when there are more vehicles to be placed in the state where the vehicle is placed in the left and right lanes in the geo-fence area, the controller is configured to place a vehicle remaining from the front area of the central lane in the geo-fence area.

9. The server according to claim 8, wherein, when placing the plurality of vehicles in the geo-fence area, the controller is configured to place the vehicles in order of size from a largest vehicle to a smallest vehicle.

10. The server according to claim 8, wherein the controller is configured to confirm the remaining area in the geo-fence area when the placing of the plurality of vehicles is completed and place the plurality of personal mobility in the confirmed remaining area.

11. The server according to claim 10, wherein the controller is configured to adjust the driving position of the vehicle placed in the central lane in the geo-fence area based on the driving position of the personal mobility.

12. The server according to claim 1, wherein the controller is configured to place the plurality of vehicles in an area corresponding to the border of the geo-fence area when the design mode is a safe mode and place the plurality of personal mobility in the central area of the geo-fence area.

13. The server according to claim 12, wherein the controller is configured to place the vehicles in order of size from a largest vehicle to a smallest vehicle when placing the plurality of vehicles.

14. The server according to claim 1, wherein the controller is configured to place the plurality of vehicles in order of size from a smallest vehicle to a largest vehicle from the front area to the rear area of the geo-fence area when design mode is aerodynamic mode, and place the plurality of personal mobility in the rear area of the largest vehicle.

15. The server according to claim 14 wherein, in response to detecting a vehicle that is less than a reference size, the controller is configured to place the plurality of vehicles less than the reference size in the rear area of the largest vehicle, and place the plurality of personal mobility in the rear area of the vehicle less than the reference size.

16. The server according to claim 1 wherein the controller is configured to place at least two personal mobility between right and left neighboring vehicles when the lane width in the geo-fence area is greater than or equal to a reference width.

17. The server according to claim 1 wherein the controller is configured to place one personal mobility in a lane in which a vehicle less than a preset size is placed when the number of lanes in the geo-fence area is less than a reference number.

* * * * *